United States Patent

Paniccia, Jr.

[11] Patent Number: 5,392,330
[45] Date of Patent: Feb. 21, 1995

[54] OFFSET DOWN CONVERSION FOR A TWO-HANDSET CORDLESS TELEPHONE SYSTEM

[75] Inventor: Samuel R. Paniccia, Jr., Liverpool, N.Y.

[73] Assignee: Thomson Consumer Electronics, Inc., Indianapolis, Ind.

[21] Appl. No.: 817,932

[22] Filed: Jan. 8, 1992

[51] Int. Cl.6 .......................................... H04M 11/00
[52] U.S. Cl. .................................... 379/61; 379/58; 455/54.1; 455/303
[58] Field of Search ............................ 379/58, 61, 63; 455/54.1, 313, 314, 315, 324, 316, 207, 209, 303, 306

[56] References Cited

U.S. PATENT DOCUMENTS

| | | | |
|---|---|---|---|
| 4,476,575 | 10/1984 | Franke et al. | |
| 4,759,078 | 7/1988 | Schiller | 455/49 |
| 4,875,231 | 10/1989 | Hara et al. | 379/61 |
| 4,932,072 | 6/1990 | Toko | 455/76 |
| 5,133,002 | 7/1992 | Kikuchi et al. | 379/58 |

FOREIGN PATENT DOCUMENTS

| | | |
|---|---|---|
| 0203819 | 12/1986 | European Pat. Off. . |
| 0304998 | 3/1989 | European Pat. Off. . |
| 0451342 | 10/1991 | European Pat. Off. ............ 455/314 |
| 1022275 | 1/1958 | Germany . |
| 3738666 | 5/1988 | Germany . |
| 2-291732 | 12/1990 | Japan . |
| 4-7923 | 1/1992 | Japan . |
| 534985 | 4/1973 | Switzerland . |

Primary Examiner—Curtis Kuntz
Assistant Examiner—G. Oehling
Attorney, Agent, or Firm—Joseph S. Tripoli; Peter M. Emanuel; Thomas F. Lenihan

[57] ABSTRACT

It is desirable that a cordless telephone system include a single base unit and at least two remote handunits. With such a system, two users may maintain participation in a three-way conversation while being free to move about within reasonable transmitting distance to and from the base unit. Circuitry is provided in which the signal received from one handunit is transmitted to the other handunit, and sidetone from one handunit is transmitted back to that handunit. The base unit comprises first and second double conversion intermediate frequency arrangements with respective first IF frequency portions being tuned away from a nominal frequency value by a substantially equal amount in opposite directions.

4 Claims, 2 Drawing Sheets

OFFSET DOWN CONVERSION FOR A TWO-HANDSET CORDLESS TELEPHONE SYSTEM

FIELD OF THE INVENTION

This invention concerns the field of cordless telephone instruments.

CROSS REFERENCE TO RELATED APPLICATION

This application is related to applications bearing U.S. Pat. application Ser. Nos. 817,934, and 817,933 filed herewith.

BACKGROUND OF THE INVENTION

Cordless telephone instruments for use in the home are widely available. Such systems, comprise a base unit and a remote handunit. The base unit is coupled to the telephone line and communicates with the remote handunit via FM radio signals. With such a cordless telephone system a user can remove the handunit from its cradle and carry it with him a short distance from his house yet still be able to make and receive telephone calls. Such a cordless telephone set is known from GE cordless telephone model number 2-9675 manufactured by Thomson Consumer Electronics, Inc. Indianapolis, Ind.

If the user is engaged in a conversation via a cordless telephone, and a third person within the user's house wishes to join in the telephone conversation, that person can simply pick up a "hard-wired" extension telephone. Unfortunately, the third person cannot maintain participation in the conversation without remaining in the immediate area of the hard-wired telephone unit.

A copending patent application bearing U.S. Pat. application Ser. No. 817,934 discloses a cordless telephone system which comprises a base unit and two handunits. In that system both handunits may be used to communicate with the base unit, but a problem may arise if one of the handunits is physically closer to the base unit than the other. In that case, the signal of the nearer handunit may be captured in both receiver channels, resulting in the loss of the signal of the more distant handunit.

SUMMARY OF THE INVENTION

It is herein recognized that in a cordless telephone system including a single base unit and at least two remote handunits, the frequencies of the first IF should be offset from the nominal 10.7 MHz value by an equal but opposite amount.

DETAILED DESCRIPTION OF THE DRAWING

Figure 1:
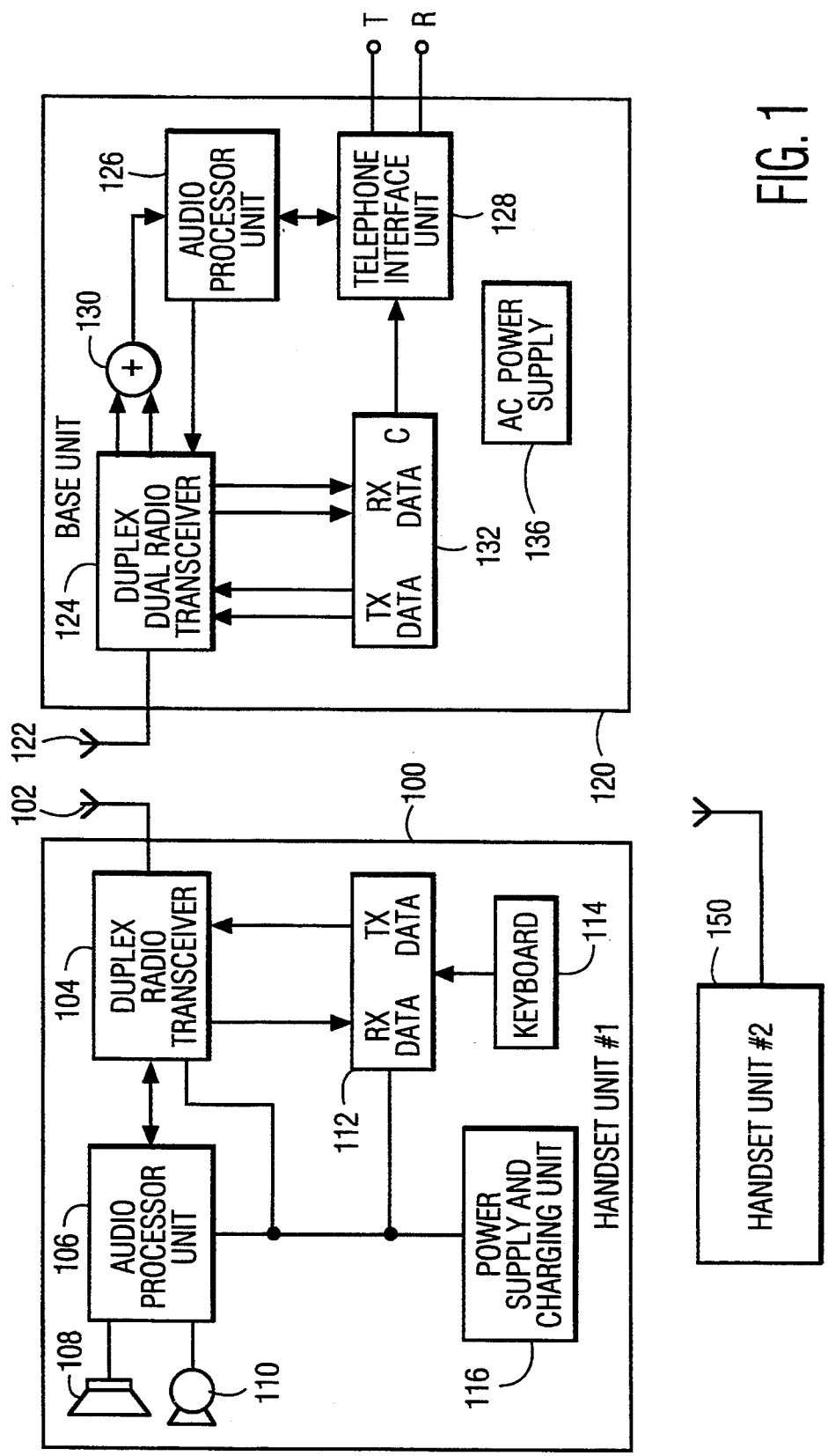
FIG. 1 is a block diagram of a cordless telephone system according to the subject invention.

FIG. 1 is a simplified illustration of a cordless telephone set comprising a first handset unit 100, a second handset unit 1.50, and a base unit 120. Because handset units 100 and 150 are identical (except for frequency allocation), only handset 100 will be described. Handset unit 100 receives and transmits RF signals via an antenna 102. Antenna 102 is coupled to a duplex radio transceiver unit 104 which is capable of operation in a receiver mode and in a transmitter mode. In the receiver mode, transceiver unit 104 applies received and demodulated audio signals to an audio processor unit 106 for amplification and ultimate reproduction in speaker 108. Also in the receiver mode, transceiver 104 also provides digital data to the "receive data" (i.e., Rxdata) terminal of controller 112, In the transmitter mode, transceiver 104 receives audio signals, picked-up (i.e., detected) by microphone 110 and amplified by audio processor unit 106, for transmission to base unit 120. Also in transmitter mode, transceiver 104 receives "transmit data" (i.e., Txdata) from controller 112, for transmission to base unit 120. Controller 112 is coupled to a keyboard 114 for receiving keystroke commands from a user. Handunit 100 also includes a power supply and charging unit 116 for supplying operating power to the circuitry of the handunit.

Base unit 120 receives and transmits RF signals via an antenna 122 to remote handunits 100 and 150. Antenna 122 is coupled to a duplex dual radio transceiver unit 124 which is capable of operation in a receiver mode and in a transmitter mode. In the receiver mode, transceiver unit 124 receives RF signals at two different frequencies from remote handunits 100 and 150 respectively, and applies received and demodulated audio signals to an audio processor unit 126 for amplification and coupling to the telephone system via a telephone interface unit 128. Telephone interface unit 128 is connected to the telephone system via two terminals traditionally known as tip (T) and ring (R). Also in the receiver mode, transceiver 124 also provides digital data to the "receive data" (i.e., Rxdata) terminal of controller 132. Controller 132 has a control terminal C by which telephone interface unit 128 can be controlled to establish communication over the telephone system. In the transmitter mode, transceiver 124 receives audio signals, conveyed by the telephone system via telephone interface unit 128 and amplified by audio processor unit 126, for transmission to handunits 100 and 150. Also in transmitter mode, transceiver 124 receives "transmit data" (i.e., Txdata) from controller 132, for transmission to handunit 100. Base unit 120 also includes an AC power supply unit 136 for supplying operating power to the circuitry of the base unit.

Figure 2:
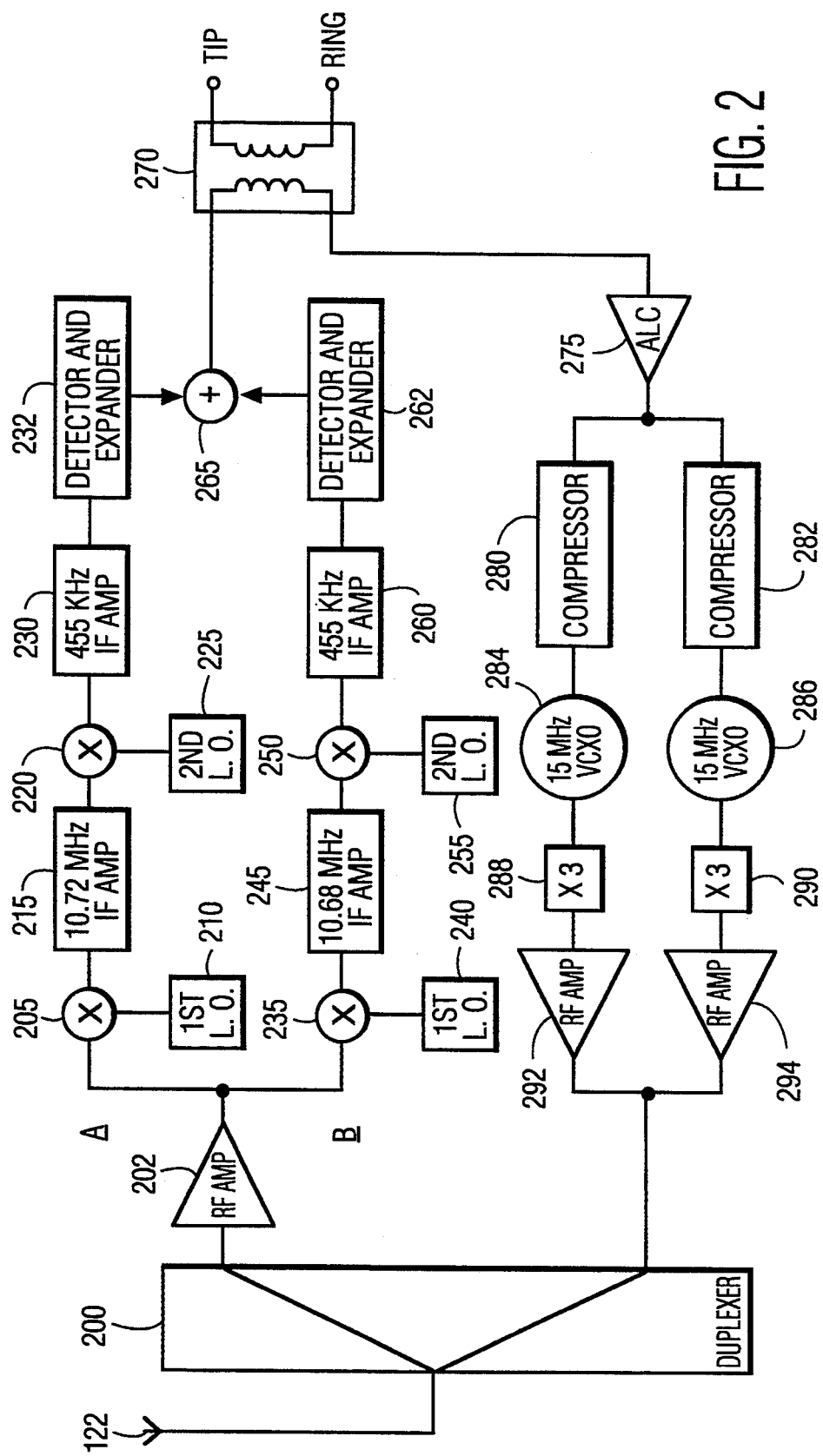
FIG. 2 is a more detailed block diagram of the base unit of FIG. 1.

FIG. 2 is a more detailed block diagram of duplex dual radio transceiver 124 of FIG. 1. Antenna 122 is coupled to an RF amplifier 202 via a duplexer 200, which may be a type DPX 46/49-B10 duplexer manufactured by Soshin Electric Ltd.. Handsets 100 and 150 transmit on different frequencies near 49 MHz. The signals received from the handunits are applied to mixers 205 and 235. Mixer 205 has a second input coupled to a local oscillator 210 for receiving an oscillator signal near 39 MHz. That is, local oscillator 210 is tuned to oscillate at the difference frequency between the transmission frequency of one of the remote handunits and the first intermediate (IF) frequency of 10.72 MHz of receiver channel A. Similarly, local oscillator 240 is tuned to oscillate at the difference between the transmission frequency of the other of the two remote handunits and the first nominal IF frequency of 10.68 MHz of receiver channel B.

The respective first IF frequencies of channels A and B are offset from the nominal value of 10.7 ZMHz for the following reason. In the situation in which both handunits are operating and one handunit is physically nearer to the base unit than the other, the stronger signal of the nearer handunit may be down-converted in both receiver channels. This occurs because some of the oscillator signal from channel A is unavoidably coupled into the mixer of channel B, and likewise, some of the oscillator signal from channel B is unavoidably coupled into the mixer of channel A. In such a case, no amount of filtering will be able to remove the undesired signal because both the desired and undesired signals are at the same frequency.

The solution to the problem is to offset the first IF frequency of channel A to 10.72 MHz and offset the first IF frequency of channel B to 10.68 MHz. Now, if leakage of the signal of one oscillator into the other mixer occurs, the resulting products will not be at the same frequency and are susceptible to being removed in the second IF stage by narrow filtering.

To clarify this point assume handunit A is transmitting at a frequency of 49.11 MHz and handunit B is transmitting at a frequency of 49.31 MHz. The first local oscillator 210 of receiver channel A will be set to oscillate at the difference between 49.11 MHz and 10.72 MHz, which is, 38.39 MHz. The first local oscillator 240 of channel B is set to oscillate at the difference between 49.31 MHz and 10.68 MHz, which is, 38.63 MHz. If a portion of the 38.63 MHz signal from oscillator 240 undesirably appears in mixer 205 then a further product will be formed at the difference frequency between the 49.31 MHz signal and the "leakage" oscillator signal of 38.63 MHz, which is, 10.68 MHz. Both the desired signal at 10.72 MHz and the undesired signal at 10.68 MHz will be passed to second mixer 220. The second local oscillator 225 of channel A is conditioned to oscillate at the difference between 10.72 MHz and the final IF frequency of 455 kHz, which is, 10.265 MHz. The desired signal at 10.72 MHz will be down converted to 455 kHz as required. The undesired signal at 10.68 MHz will be down-converted to 415 kHz, which is out of the passband of the second IF unit 230.

The down-converted 455 kHz signal of each channel is applied to respective IF amplifiers 230 and 260. After amplification the signals are detected and expanded in detector and expander units 232 and 262 to produce baseband audio signals. The baseband audio signals are then summed in a summer unit 265 and coupled to the telephone line via a hybrid transformer unit 270.

For purposes of explanation, assume that handset A transmits the signal processed in receiver channel A and handset B transmits the signal processed in receiver channel B. An A+B sidetone signal (i.e., a portion of the received signals from both channels) is coupled from hybrid transformer unit 270 via an automatic level control unit 275 to the transmitter side of the transceiver for transmission to the handunits. In this way, the sidetone signal corresponding to signals received from handset A is coupled back to handset A, and the signal received from handset A is also transmitted to handset B for A-to-B communication. Further, the sidetone signal corresponding to signals received from handset B is coupled back to handset B and the signal received from handset B is also transmitted to handset A for B-to-A communication.

The signal from automatic level control unit 275 is applied to the inputs of two compressor units 280 and 282. The compressed audio signals are applied to control inputs of separate oscillators 284 and 286 to modulate their respective output signals. Oscillators 284 and 286 oscillate at different frequencies near 15 MHz. The modulated signals are then applied to respective frequency triplers 288 and 290 to bring their final frequencies to different frequencies near 46 MHz. The signals are the amplified in amplifiers 292 and 294, are combined, and applied via duplexer 200 to antenna 122.

What is claimed is:

1. A cordless telephone set, comprising:
   a first handunit for producing a first audio signal;
   a second handunit for producing a second audio signal; and
   a base unit for receiving signals of said handunits, and coupling said signals of said handunits to a telephone system;
   said base unit including means for combining said received signals of said handunits to form a single output signal for transmission via said telephone system;
   said handunits and said base unit communicating via a single antenna mounted on said base unit;
   said first handunit transmitting said first audio signal on a first frequency and receiving on a second frequency;
   said second handunit transmitting said second audio signal on a third frequency and receiving on a fourth frequency; and
   in order to provide for a three-way conversation said first audio signal received from said first handunit is transmitted by said base unit to said second handunit, and said second audio signal received from said second handunit is transmitted by said base unit to said first handunit;
   said base unit employing a first double conversion intermediate frequency arrangement for processing signals received at said first frequency, and a second double conversion intermediate frequency arrangement for processing signals received at said third frequency;
   said first and second double conversion intermediate frequency arrangements having respective first IF frequency portions, said respective first IF frequency portions being tuned away from a nominal frequency value by a substantially equal amount in opposite directions.

2. The cordless telephone set of claim 1 wherein,
   said nominal frequency value of each of said respective first IF frequency portions of said first and second double conversion intermediate frequency arrangements is approximately 10.7 MHz.

3. The cordless telephone set of claim 2 wherein,
   said base unit includes first and second receiving channels, and first and second transmitting channels;
   said first and second receiving channels being double conversion tuning circuits each including first and second mixer stages and first and second local oscillators;
   each of said double conversion tuning circuits having a first intermediate frequency amplifier, and a second intermediate frequency amplifier tuned to 455 kHz;
   said first intermediate frequency amplifier of said first receiving channel being offset from said nominal value of 10.7 MHz to a higher frequency by a predetermined value, and said first intermediate frequency amplifier of said second receiving channel being offset from said nominal value of 10.7 MHz to a lower frequency by said predetermined value.

4. The cordless telephone set of claim 3 wherein,
   said predetermined offset value is approximately 20 kHz;
   said first intermediate frequency amplifier of said first receiving channel being tuned to approximately 10.72 MHz, and said first intermediate frequency amplifier of said second receiving channel being tuned to approximately 10.68 MHz.

* * * * *